M. M. GOLDMAN.
TOWING DEVICE.
APPLICATION FILED DEC. 26, 1918.
1,378,225.
Patented May 17, 1921.
2 SHEETS—SHEET 1.
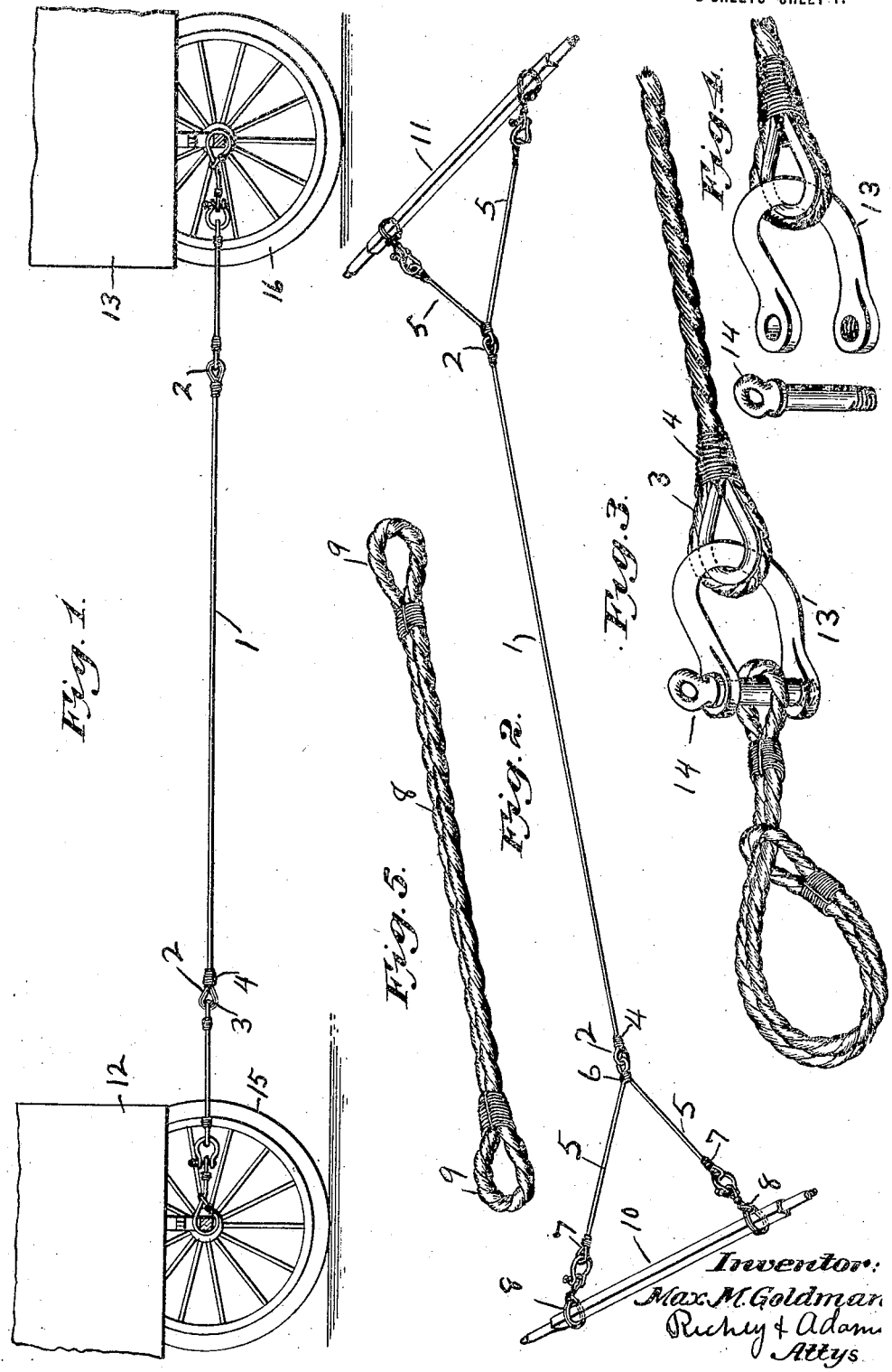
Inventor:
Max. M. Goldman
Richey & Adam
Attys

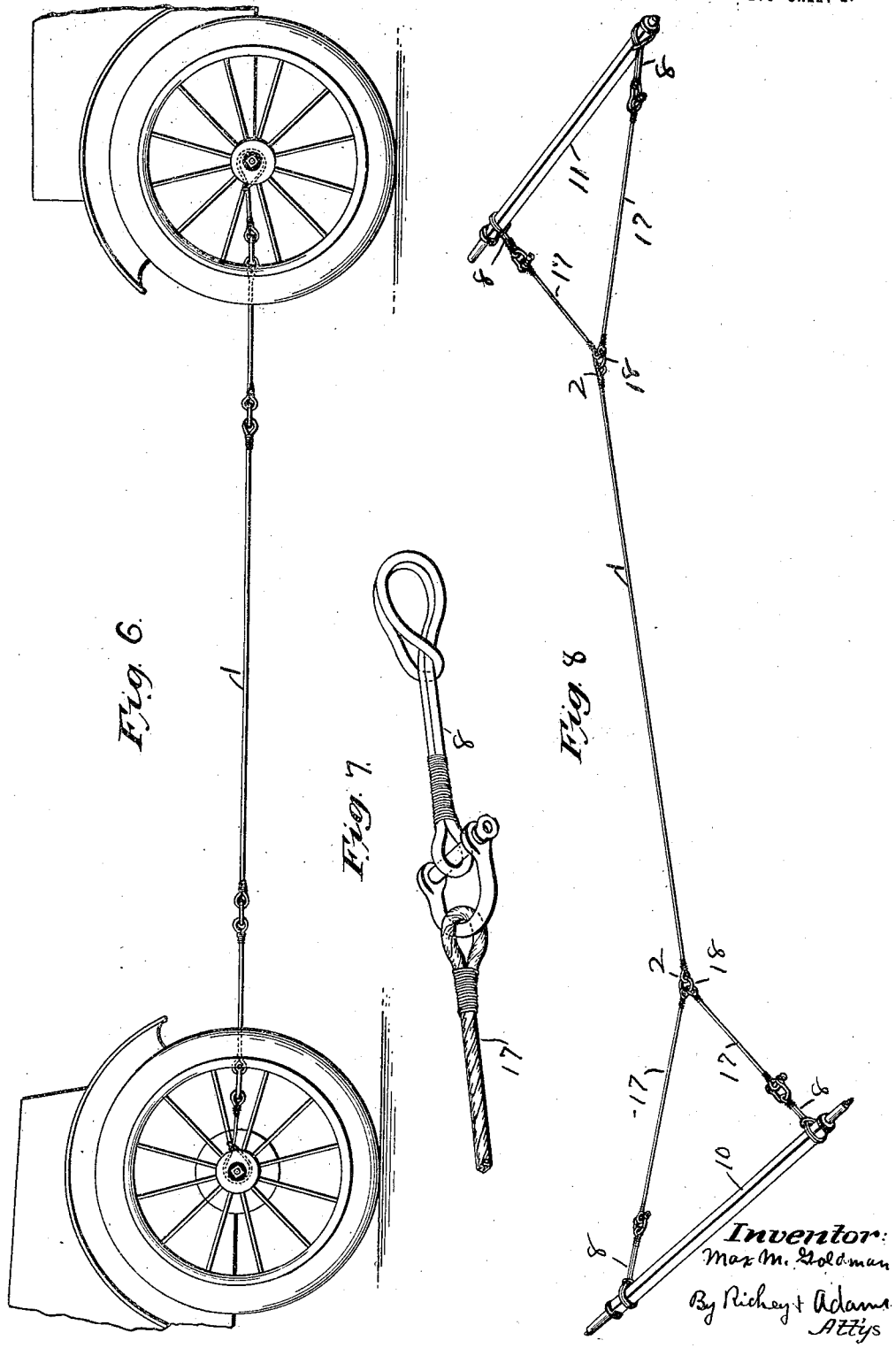

UNITED STATES PATENT OFFICE.

MAX MILLIAN GOLDMAN, OF SOMERVILLE, MASSACHUSETTS.

TOWING DEVICE.

1,378,225.  Specification of Letters Patent.  Patented May 17, 1921.

Application filed December 26, 1918. Serial No. 268,407.

*To all whom it may concern:*

Be it known that I, MAX M. GOLDMAN, a citizen of the United States, residing at Somerville, in the county of Middlesex and State of Massachusetts, have invented certain new and useful Improvements in Towing Devices; and I do hereby declare the following to be a full, clear, and exact description of the same, such as will enable others skilled in the art to which it appertains to make and use the same.

This invention relates to towing devices, and is adapted for use wherever one vehicle or other apparatus is to be moved by a separate source of power, such as another vehicle.

One object of the invention is to secure a flexible connection that can be readily secured to the vehicle to be towed, as well as to that furnishing the tractive force.

Another object is to secure a towing cable to a vehicle by flexible guys or cable braces, which diverge at an angle from each other, in such a way that the cable will not be liable to contact with the wheels of the vehicle in rounding curves.

Other objects will appear in the following specification.

In the drawings:

Figure 1 is an elevation of two vehicles connected together by my improved cable connection.

Fig. 2 is a perspective view of the cable connection attached to vehicle axles.

Fig. 3 is an enlarged view of one of the cable braces connected to the attaching cable.

Fig. 4 is a detailed view of the clevis arrangement.

Fig. 5 is a perspective view of the attaching cable.

Fig. 6 is an elevation of a modification of the invention.

Fig. 7 is a perspective view of the attaching and bracing cables connected together.

Fig. 8 is a perspective of the towing connection shown in Fig. 6.

The improved connection consists of a main cable 1, having an eye 2 formed at each of its ends, preferably by slipping the cable around a bent strip or thimble 3, similar to that shown in Fig. 3. The ends of the cable, after being looped around the thimble, are secured by appropriate means 4, as clearly shown on the drawing.

A cable 5 is passed through each of the eyes 2 and then bound together at 6 by suitable clamps, so that the two ends of the cable form braces adapted to be spread apart and connected to the towing and towed devices. Each of the free ends of the cables 5 are looped back and bound together at 7 to form eyes, for a purpose to be referred to later.

An attaching cable 8, which need not be so long as the other cables referred to, is looped at the ends to form eyes 9, which are large enough to permit the cable being drawn therethrough, and these are adapted to be passed around the axles 10 and 11, or similar parts of the vehicles, such as 12 and 13.

To permit of the ready connection of the bracing cables with the attaching cables, I prefer to use clevises or shackles 13, which have detachable pins 14, preferably screwing into the clevis at one end.

To apply my improved form of towing connection to vehicles, the cables 8 are first passed around the axles 10 and 11 in spaced relation, as shown clearly in Fig. 3 of the drawing. The bracing cables 5, 5 at each end are then connected to the other eyes or loops of the cables 8 by means of clevises 13, as shown. The connection is then complete and heavy loads can be towed, without difficulty. It will be apparent that by my improved form of connection a curve may be rounded without the main cable 1 rubbing against the wheels, such as 15 and 16, and furthermore, the pull is transmitted to those parts of the axles that lie closely adjacent to the wheels, which is a good mechanical arrangement. On account of the cables 8 being looped around the axle, as shown, a firm grip will be obtained and there will be no slippage on the axle. Since the entire arrangement is made of flexible cable, which has great strength in comparison to its size, the entire towing arrangement can be carried in small space, and on account of the construction, can be readily connected to and disconnected from vehicles for towing purposes. A great deal of time is thus saved, and very satisfactory results are obtained.

In the modification, or embodiment, shown in Figs. 6 to 8 inclusive, the construction is the same as that previously described, excepting that there are no thimbles in the loops in each of the cables, and the cables 17 are made separate from each other. The latter are connected to the main cable 1 by some means, such as rings 18. The method of attaching and detaching the cables to the vehicle axles is the same as has already been described in connection with the first embodiment and need not be repeated.

It will be apparent that my improvement is not limited to the specific embodiments shown, as they may be varied without departing from the spirit of the invention.

I claim:—

1. In connecting devices for towing purposes, a main cable having an attaching eye at each end, bracing cables secured in said eyes and having eyes at their free ends, attaching cables having eyes at each of their ends and adapted to be looped in spaced position around an element in the device to be towed, and means for detachably securing the eyes of the bracing cables to those of the attaching cables.

2. In connecting devices for towing purposes, a main cable having attaching eyes at each end, bracing cables secured in one of said eyes and having eyes at their free ends, attaching cables having eyes at each of their ends and adapted to be looped in spaced relation around elements in the towing and towed devices and threaded through one of their eyes, and clevises adapted to pass through the eyes of the free ends of the attaching and bracing cables whereby they are detachably secured together.

In witness whereof, I have hereunto signed my name this 17th day of December, 1918.

MAX MILLIAN GOLDMAN.